United States Patent [19]

Holte

[11] 4,426,674
[45] Jan. 17, 1984

[54] DISPLACEABLE, ELECTRIC DISTRIBUTION DEVICE FOR BUILDING SITES OR SIMILAR

[76] Inventor: Hans Holte, N-3810 Gvarv, Norway
[21] Appl. No.: 305,648
[22] PCT Filed: Apr. 13, 1981
[86] PCT No.: PCT/NO81/00010
  § 371 Date: Sep. 23, 1981
  § 102(e) Date: Sep. 23, 1981
[87] PCT Pub. No.: WO81/03088
  PCT Pub. Date: Oct. 29, 1981

[30] Foreign Application Priority Data
  Apr. 14, 1980 [NO] Norway .................................. 801079

[51] Int. Cl.³ .............................................. H02B 1/02
[52] U.S. Cl. .................................. 361/384; 174/52 R; 248/175; 361/428; 361/429
[58] Field of Search ............... 361/334, 356, 417, 419, 361/420, 428, 429; 206/509, 510, 511, 512; 174/52 R; 211/194; 248/76, 89, 80, 81, 75, 175, 441 D

[56] References Cited
U.S. PATENT DOCUMENTS

| 1,369,742 | 2/1921 | Halpin | 248/175 |
| 2,756,368 | 7/1956 | Gross et al. | 361/429 X |
| 3,050,207 | 8/1962 | Oxenham | 206/511 X |
| 3,457,462 | 7/1969 | Gargala et al. | 361/334 X |
| 4,095,871 | 6/1978 | Holte | 191/12.4 X |

FOREIGN PATENT DOCUMENTS 889638  2/1962  United Kingdom ............ 174/52 R

Primary Examiner—A. T. Grimley
Assistant Examiner—Gregory D. Thompson
Attorney, Agent, or Firm—Holman & Stern

[57] ABSTRACT

In a displaceable, electric distribution device for building sites or similar consisting of a main section holding current distribution equipment, other equipment and/or instruments, the main section (2) is mounted in a rack, which when the device (1) is uninfluenced by outer forces assumes specific positions for use. By means of relatively small outer forces, the device can nevertheless be moved from one position for use to another by rolling the rack (3). The rack (3) can comprise two substantially equal sets of rockers (10a, 10b) arranged parallel to each other on either side of the main section (2). The rockers (10a, 10b) can have a generally oval shape or the shape of an ellipsis. Aside from assuming specific positions for use and allowing rolling of the device, the rack can in overturned position allow for the possibility of stacking several devices on top of each other.

11 Claims, 8 Drawing Figures

DISPLACEABLE, ELECTRIC DISTRIBUTION DEVICE FOR BUILDING SITES OR SIMILAR

The present invention relates to a displaceable, electric distribution device for building sites or similar, comprising a main section holding current distribution equipment, other equipment and/or instruments.

Displaceable or portable, electric distribution devices for building sites are previously known. For example, there has been suggested a cabinet-like device provided on four legs. However, such cabinet-like devices are generally very heavy, and very often two men are required for the displacement thereof. Besides, such cabinets can easily overturn in case somebody should hit them, which could involve damage of the equipment. If the device is located outdoors, the equipment in such an overturned or tilted device can easily be further damaged, due to rain or other moisture entering the cabinet.

Further, such devices require a relatively flat base to be erected upon, and the manufacturing thereof is relatively costly.

An object of the present invention is to give instructions for a displaceable, electric distribution device, which aside from offering an excellent protection for the current distribution equipment against bumps and impacts, also allows for an easy access to the equipment.

Another object of the invention is to arrive at a device which does not depend on a completely flat base, but which, even if overturned, offers the distribution equipment the best possible protection against bumps and impacts, as well as against water spray and rain.

Still another object of the present invention is to give instructions for a device which can easily be moved or displaced at the site itself, the device after the displacement adopting a correct position for use.

A still further object of the present invention is to give instructions for a device which is inexpensive and simple to manufacture, and which can easily be stacked one upon the other and thus easily be expanded to larger, compound, compact units, in which the main sections constitute the main components which can easily be replaced according to the demand.

In a device of the type stated in the preamble, these objects are according to the invention achieved in that the main section is mounted in a rack, which when the device is uninfluenced by outer forces, assumes specific positions for use, but which by means of relatively small forces can be displaced by rolling the rack.

In an appropriate embodiment of the device according to the invention, the rack may comprise two substantially equal sets of rockers, which are arranged parallel to each other on either side of the main section and attached thereto, each set of rockers on the one hand being provided with approximate semi-circular portions allowing for rolling of the rack, and on the other hand between the approximate semi-circular portions being provided with portions upon which the device in an uninfluenced condition will rest to assume positions for use. Such resting portions of the rockers can be formed by portions having larger radius of curvature than the approximate semi-circular portions, the rockers then having an oval or ellipsis-shaped design, or the resting portions of the rockers can be formed by inwardly bent rocker pieces forming points of supports for the positions for rest or use of the device.

The mains section itself, to which the rack is attached, can have any suitable shape. For example, the rack can be attached to a tube-shaped main sections, the centre axis of which being parallel to the plane extending through the respective rocker sets of the rack. Alternatively, the rack sets and the main section may be provided in such a manner relatively to each other that the axis of the tube-shaped main section is perpendicular to the plane extending through the respective rack rocker sets.

In order to enable rolling of the device for the movement and displacement thereof, the rockers must be so provided that the main section is provided inside the circumference thereof. When at the same time providing the rockers so that the planes extending therethrough also lie outside the main section, the device can be turned over on the side for thereby adopting a stable position and allowing stacking of other overturned devices on top of each other.

Such a stacking can be appropriate in connection with common transportation of a plurality of devices, but such a stacking can also be utilized in larger distribution centrals, which are composed of units in which the main sections constitute the main components which can easily be replaced as necessary.

Preferably, the rack is attached to the main section by attachment pieces, onto which the cable can be wound or from which the cable can be wound off. Suitably, the cable can then be wound on or off the device during the movement thereof from one site to another.

In the following the invention will be further described, reference being had to the drawing which illustrates various embodiments of the device according to the invention.

FIG. 6b is a perspective view of a variant of the embodiment illustrated in FIG. 6a.

Figure 1:
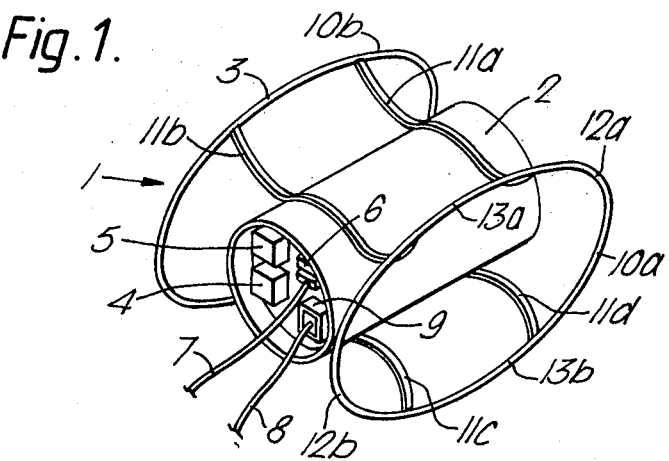
FIG. 1 is a diagrammatic perspective view of a first embodiment of the device according to the invention.
Figure 2:
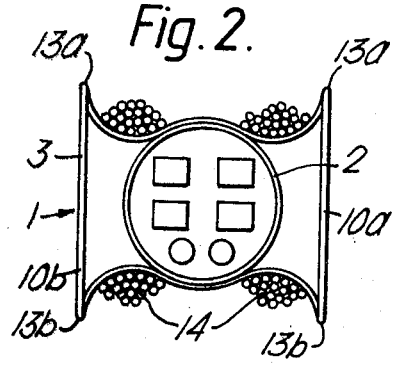
FIG. 2 is an end view of the device in FIG. 1.
Figure 3:
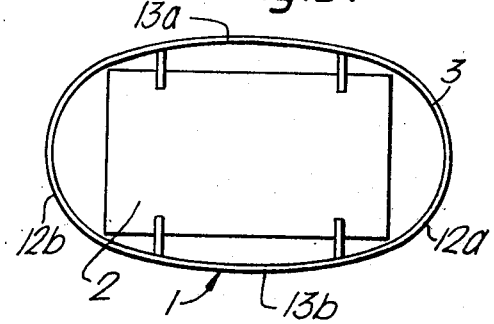
FIG. 3 is a side view of the device in FIG. 1.

In FIGS. 1-3, which involve a perspective view, an end view and a side view, respectively, of a first embodiment of a device according to the invention, the device itself is designated by 1, the device comprising a main section 2 holding current distribution equipment, other equipment and/or instruments and a rack 3 attached to the main section 2 by appropriate, not illustrated, holding means. In the embodiment illustrated in FIGS. 1-3 the main sections 2 has the general shape of a tube or pipe, which is manufactured from an electric insulating and somewhat yielding material, such as plastics, and which, for example, at the one end can be equipped with a spray-safe, not illustrated, lid, which can be attached to the main section 2 by a spring loaded hinge means. At both ends of the tube-shaped main section 2 there is access to the electric equipment contained in the main section 2, which equipment, for example, can consist of socket outlets 4, 5 and 6 having various ratings. For example, the socket outlet 4 and 5 may constitute outlets for lighting circuits, whereas the socket outlet 6 is an outlet for technical circuits, there being connected a branch conductor 7 to the socket outlet 6. In FIG. 1 there is also illustrated a supply cord 8, which either can be permanently connected to the main section 2, or be plugged into a plug socket 9 provided in the main section 2.

The rack 3 which is illustrated in FIGS. 1-3, comprises two substantially equal metal rockers 10a and 10b, respectively, which can be round or flat and which are provided parallel to each other on either side of the main section 2 and attached thereto by intermediate connection pieces 11a, 11b, 11c and 11d. Each rocker is given an oval shape, such as an egg- or ellipsis-shape, the large axis of the ellipsis being arranged parallel to the centre axis of the tube-shaped main section 2. Thus, the rockers 10a and 10b are provided with approximate semi-circular end portions 12a and 12b and with intermediate portions 13a and 13b which have larger radius of curvature than the approximate semicircular portions 12a and 12b. The oval or ellipsis-shaped design of the rockers 10a, 10b of the rack involves that when the device 1 is uninfluenced by outer forces, it will assume a position for use, in which it rests on the intermediate portions having relatively large radius of curvature, either pf 13a or 13b, and by light bumps or impacts it will only tip out of its normal position of use for thereafter to rock back to its normal position. The design of the rack 3 also involves that it offers a further protection to the main section 2 in addition to what it already offered by its tube-shaped design, since the rack will yield somewhat when it hits a hard base. Besides, the shape of the rockers of the rack involves that the device assumes quite specific positions for use, so that the main section 2 itself obtains an approximate horizontal position and thereby an excellent protection against water-spray and rain. However, the shape of the rack 3 also offers an additional advantage because the use of relatively small outer forces can displace the complete device 1 by the rolling thereof on the rockers 10a, 10b of the rack.

Experiments have shown that a finished mounted device which from a large height has been dropped several times down onto a hard base, did not become damaged due to the impact stresses imported thereonto during the drops.

It is to be understood that in order to facilitate the rolling of the device in the rack 3, the rockers 10a, 10b must have such a size that they embrace the circumference of the main section 2, as this most clearly appears from FIG. 3, to avoid that parts of the main section extend therebeyond and brake the rolling operation. However, it is also to be understood that the rockers 10a, 10b should preferably be attached to the main section in such a way that the respective planes in which the rockers are located, lie beyond the main section 2. In case the device turns over on the side, it will then adopt a completely stable position, which is suitable for stacking as this will be further described in connection with FIG. 7.

As mentioned, the rack 3 is attached to the main section 2 by connection pieces 11a-11d and these may preferably be shaped so as to form winding supports for the supply and/or branching cable, as this is exemplified by reference numerals 14 in FIG. 2.

Appropriately, the winding on or winding off of the cable can take place during the rolling displacement of the device from one site to another and in the embodiment illustrated in FIG. 1, in which the wound cable more or less will cover the access to the equipment in the main section 2, it will be ensured that all cable is to be unwound before the device is taken into use. The device can then be used at maximum rating without the risk of too high heat development in the wound cable or cables or in the main section.

Figure 4:
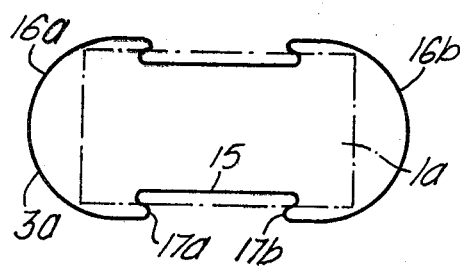
FIG. 4 is a diagrammatic side view of a variant of the embodiment of a rack, which is comprised by the present invention.

In FIG. 4 there is illustrated a diagrammatic side view of a variant of a rack according to the invention. Here, the rockers 3a are provided with offset rocker portions 15, so that between the rounded end portions 16a and 16b there are formed support points 17a, 17b on which the device 1a will rest in its normal position for use.

Figure 5:
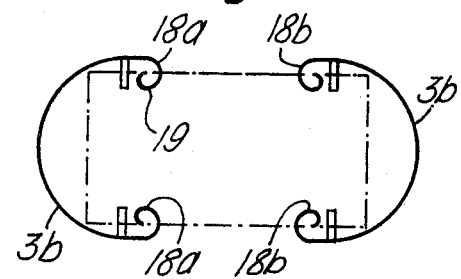
FIG. 5 is another variant of a rack, which is comprised by the present invention.

In FIG. 5 there is illustrated another variant of a rocker set 3b, in which there are formed support points 18a, 18b by means of inwardly bent or twisted rocker pieces 19.

Figure 6A:
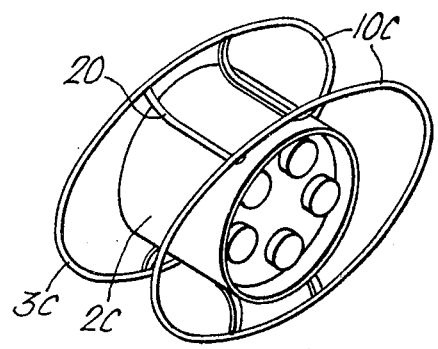
FIG. 6a is a perspective view of an alternative embodiment of a rack and a main section.

In FIG. 6a there is illustrated an alternative embodiment of a device according to the invention, wherein the rack 3c can have a form generally similar to the rack 3 discussed in connection with FIGS. 1-3, or have suitable shapes conforming to the intentions of the invention, but wherein the tube-shaped main section 2c has its central axis arranged perpendicular to the plane extending through the rack rockers 10c. In this embodiment a possible cable can be wound up between the rockers 10c on the connection pieces 20, and because the access to the equipment in the main section 2c is from the side, it is not necessary that all the cable is reeled off to allow for the operation of the device.

Figure 6B:
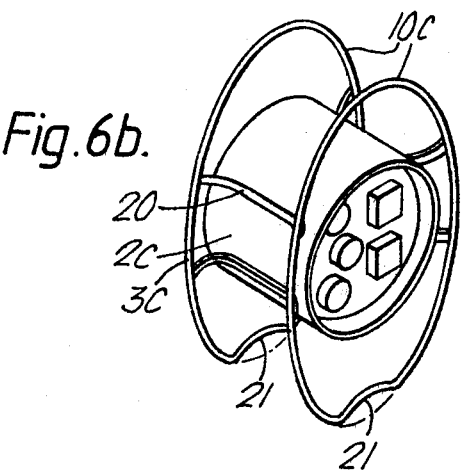

FIG. 6b illustrates a variant of the embodiment in FIG. 6a, the rockers 10c here being provided with substantially the same shape as the rockers in FIG. 6a, i.e. ellipsis- or oval-shaped, but involving the difference that the device can be put in an upright position and remain stable in this position because of concave zones 21 at the ellipsis portions having least radius of curvature. In FIG. 6b there are illustrated concave zones 21 only at the one end of the rockers 10c, but it is to be understood that such concave zones can also be provided at opposite portions of the rockers. The concave zones 21 are shaped such that they form stable resting positions for the device during normal working conditions, but they will nevertheless allow rolling of the device by means of comparatively small outer forces.

Figure 7:
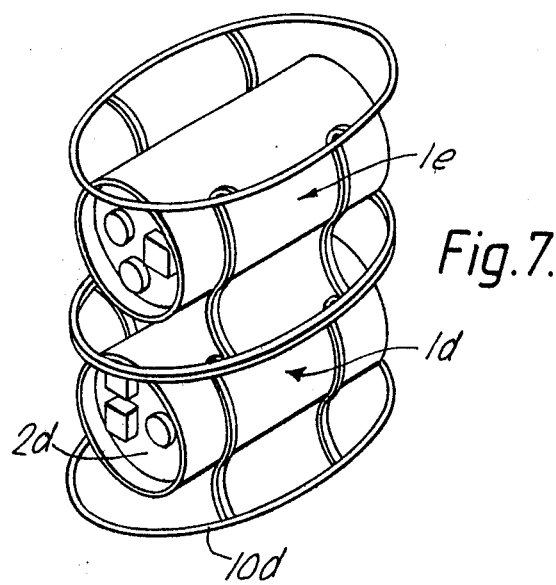
FIG. 7 depicts two overturned devices according to the invention stacked one upon the other.

In FIG. 7 there is illustrated an embodiment of a device 1b similar to that discussed in connection with FIGS. 1-3, but which is turned over on the side, in other words resting on one of the rockers 10d. In this position the device 1d rests completely stable and at the same time allows full access to the instruments and the equipment which is housed in the main section 2d.

On top of the overturned device 1d there is stacked another similar device 1e, which is also in its overturned but stable position. Such a stacked arrangement of devices can be appropriate during transport of devices from the place of manufacture to the place of delivery, possibly by combining a plurality of units to a larger central, in which the main sections constitute the main components which possibly can be replaced according to the demand.

Appropriately, the stacks may be provided with suitable protrusions which facilitate the stacking of the devices in overturned position and maintain the stacked position thereof.

It is to be understood that the device according to the invention offers a series of advantages compared to previously known displaceable, electric distribution devices for building sites. The device according to the invention can, although it is large and heavy, be rolled from one place to another by use of minimum forces. Nevertheless, it will after the movement adopt a position for use which entails that the contents of the main section will not be exposed to rain or water spray. Reeling on and reeling off of the cable can take place simultaneously with the movement, something which can be appropriate when long and heavy cables are involved. Further, the rack together with the cover of the main section render to the contents of the main section a double, mechanical protection, and experiments have shown that even when falling from large heights against a hard base, the collision against the base has been so damped that the device after the fall was quite intact.

The device according to the invention can be turned over on the side and will then remain stable, the device in this overturned position allowing for stacking for transport or interconnection with larger centrals.

Of course, the device according to the invention can be implemented in other ways than the ones described above.

Thus, the shape of the main section can be not only tube-shaped, but have any suitable form, for example as a cabinet, case or similar. Also the shape of the rack can be varied within wide limits. Aside from oval- or ellipsis-shape, it can adopt a hexagonal-shape or suitable other shapes which allow for specific positions for use of the device, but nevertheless allow rolling of the device by use of minimum force.

I claim:

1. A portable electrical distribution apparatus having a housing containing current distribution equipment and rotatable support frame means having at least one stable rotational position and selectively rotatable for moving said housing, said frame means comprising a pair of parallel frame members spaced from one another on opposite sides of said housing, each frame member having a pair of rounded end sections of predetermined radius of curvature and at least one intermediate section of different shape than said end sections to define said one stable rotational position.

2. The apparatus according to claim 1 wherein said rounded end sections of said frame members are generally semi-circular.

3. The apparatus according to claim 2 wherein said end sections are spaced from one another by two opposite sections having a greater radius of curvature than said end sections so that each frame member takes the general form of an ellipse.

4. The apparatus according to claim 2 wherein said end sections are spaced from one another by two spaced intermediate sections formed by radially inwardly bent portions of the frame members.

5. The apparatus according to claim 2 wherein said housing has a generally tubular-shaped configuration with a central axis oriented parallel to said frame members.

6. The apparatus according to claim 2 wherein said housing has a generally tubular shaped configuration with a central axis oriented perpendicular to said frame members.

7. The apparatus according to claim 2 further comprising means securing the frame members to the main housing such that the respective planes of the frame members lie peripherally beyond the housing and such that the apparatus can be turned over onto one of the frame members and remain stable and allow stacking of other overturned apparatus.

8. The apparatus according to claim 7 further including means for locking the stacked apparatus together.

9. The apparatus according to claim 2 further comprising connecting means securing the frame members to the housing, said connecting means including support means onto which cable can be reeled.

10. The apparatus according to claim 2 wherein said intermediate section has a concave zone defining the stable position for the apparatus.

11. The apparatus according to claim 2 wherein said end sections are spaced from one another by gaps in said frame members defining two spaced intermediate sections which in turn define two stable rotational positions of said apparatus.

* * * * *